United States Patent
Saleem

(10) Patent No.: US 10,704,485 B2
(45) Date of Patent: Jul. 7, 2020

(54) FAULT DETECTION AND ISOLATION FUEL SYSTEM LEAN MONITOR RATIONALIZED WITH MANIFOLD ABSOLUTE PRESSURE SENSOR

(71) Applicant: Atheel Saleem, Farmington Hills, MI (US)

(72) Inventor: Atheel Saleem, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 108 days.

(21) Appl. No.: 16/018,398

(22) Filed: Jun. 26, 2018

(65) Prior Publication Data
US 2019/0390622 A1    Dec. 26, 2019

(51) Int. Cl.
| F02D 41/14 | (2006.01) |
| G01M 15/10 | (2006.01) |
| F02D 41/22 | (2006.01) |

(52) U.S. Cl.
CPC ....... *F02D 41/1495* (2013.01); *F02D 41/145* (2013.01); *F02D 41/1454* (2013.01); *G01M 15/106* (2013.01); *F02D 2041/225* (2013.01)

(58) Field of Classification Search
CPC .............. F02D 41/1495; F02D 41/145; F02D 41/1454; F02D 2041/225; G01M 15/106
See application file for complete search history.

(56) References Cited

U.S. PATENT DOCUMENTS

| 4,277,772 A * | 7/1981 | Kastura ................ B60K 35/00 340/459 |
| 5,617,722 A * | 4/1997 | Takaku ................ F01N 11/002 60/277 |
| 6,594,987 B2 * | 7/2003 | Uranishi ............... F01N 11/007 123/90.15 |
| 7,962,271 B1 | 6/2011 | Thompson et al. |
| 2003/0115854 A1 * | 6/2003 | Tamura ................ F01N 3/0814 60/277 |

(Continued)

OTHER PUBLICATIONS

Aitouche, A., et al.,"Fault detection and isolation of PEM fuel cell system based on nonlinear analytical redundancy", European Physical Journal: Applied Physics, EDP Sciences, 54 (2), p. 1-12 (2011).

(Continued)

*Primary Examiner* — Joseph J Dallo
(74) *Attorney, Agent, or Firm* — Ralph E Smith

(57) ABSTRACT

A lean operation fault detection and isolation (FDI) technique involves receiving, from a manifold absolute pressure (MAP) sensor, a measured MAP, detecting a lean operation fault where an engine is operating with a lean air/fuel ratio, estimating, using an observer, (i) an air/fuel ratio of an exhaust gas produced by the engine and (ii) the MAP, monitoring first and second residual values indicative of differences between (i) the estimated air/fuel ratio of the exhaust gas and a measured air/fuel ratio of the exhaust gas from an exhaust O2 sensor and (ii) the estimated MAP and the measured MAP from the MAP sensor, respectively, and, based on the monitoring of the first and second residual values, determining which of (i) an air intake of the engine, (ii) the exhaust O2 sensor, and (iii) a fuel injector of the engine is malfunctioning and causing the lean operation fault.

16 Claims, 3 Drawing Sheets

(56) References Cited

U.S. PATENT DOCUMENTS

| | | | |
|---|---|---|---|
| 2009/0250038 A1 | 10/2009 | Xu et al. | |
| 2011/0202256 A1* | 8/2011 | Sauve | F02D 41/0025 |
| | | | 701/104 |
| 2012/0006107 A1* | 1/2012 | Azadeh | F02D 41/008 |
| | | | 73/114.31 |
| 2013/0019846 A1* | 1/2013 | Inoue | F02D 41/221 |
| | | | 123/568.11 |
| 2014/0020655 A1* | 1/2014 | Ito | F02D 41/22 |
| | | | 123/339.1 |

OTHER PUBLICATIONS

Mahanijah, M.K., et al., "Fault detection and isolation based on feedforward-feedback control for oxygen excess of fuel cell stack", Proceedings of the 19th International Conference on Automation & Computing, Brunel University, Uxbridge, UK, https://www.researchgate.net/publication/261460628, p. 1-6 (Sep. 13-14, 2013).

Pattipati, Bharath, et al., "Electronic Returnless Fuel System Fault Diagnosis and Isolation: A Data-Driven Approach", Annual Conference of Prognostics and Health Management Society, p. 1-9 (2013).

Wang, Changhui, et al., "Estimation of Individual Cylinder Air-Fuel Ratio in Gasoline Engine with Output Delay", Hindawi Publishing Corporation, Journal of Sensors, vol. 2016, Article ID 5908456, 9 pages (2016).

* cited by examiner

FAULT DETECTION AND ISOLATION FUEL SYSTEM LEAN MONITOR RATIONALIZED WITH MANIFOLD ABSOLUTE PRESSURE SENSOR

FIELD

The present application generally relates to fuel system diagnostics and, more particularly, to a fault detection and isolation (FDI) fuel system lean monitor rationalized with a manifold absolute pressure (MAP) sensor.

BACKGROUND

An internal combustion engine combusts a mixture of air and fuel within cylinders to generate drive torque. For each type of fuel, there is an optimal ratio of air/fuel that results in complete combustion. This is also known as a stoichiometric air/fuel ratio. Airflow and fueling is regulated based on feedback from various sensors in an effort to maintain this stoichiometric air/fuel ratio. Lean operation refers to the combustion of fuel with an excess of air (i.e., a higher than stoichiometric air/fuel ratio). Lean operation is typically diagnosed as a fault because it requires higher ignition temperatures and therefore sometimes results in misfires. The cause of a lean operation fault, however, could be one of a variety of components malfunctioning. This often results in a non-malfunctioning component being replaced during servicing, which increases service time and warranty costs. Accordingly, while such fuel system diagnostics do work well for their intended purpose, there remains a need for improvement in the relevant art.

SUMMARY

According to one example aspect of the invention, a lean operation fault detection and isolation (FDI) system for an engine of a vehicle, the engine having a fuel system comprising at least one fuel injector, is presented. In one exemplary implementation, the FDI system comprises: an intake manifold absolute pressure (MAP) sensor configured to measure a MAP indicative of a pressure of air in an intake manifold of the engine, the air having been drawn into the intake manifold through an air intake and a controller configured to: detect a lean operation fault where the engine is operating with a lean air/fuel ratio, using an observer, estimate (i) an air/fuel ratio of an exhaust gas produced by the engine and (ii) the MAP, monitor first and second residual values indicative of differences between (i) the estimated air/fuel ratio of the exhaust gas and a measured air/fuel ratio of the exhaust gas from an exhaust oxygen (O2) sensor and (ii) the estimated MAP and the measured MAP from the MAP sensor, respectively, and, based on the monitoring of the first and second residual values, determine which of (i) the air intake, (ii) the exhaust O2 sensor, and (iii) the fuel injector is malfunctioning and causing the lean operation fault.

In some implementations, the observer is a Luenberger observer with a tunable gain.

In some implementations, the controller is configured to determine that the air intake is malfunctioning and causing the lean operation fault when: the second residual value is not within a threshold amount from zero, and the first residual value has rise time, peak time, and a steady-state value for all firing events that are greater than respective thresholds. In some implementations, the malfunction of the air intake is a leak in the air intake.

In some implementations, the controller is configured to determine that the fuel injector is malfunctioning and causing the lean operation fault when: the second residual value is within the threshold amount from zero, and the first residual value has a steady state value for a single firing event that is less than a threshold. In some implementations, the malfunction of the fuel injector is the fuel injector is stuck closed or clogged.

In some implementations, the controller is configured to determine that the exhaust O2 sensor is malfunctioning and causing the lean operation fault when: the second residual value is within the threshold amount from zero, and the first residual value has a steady state value across all firing events that is less than a threshold. In some implementations, the malfunction of the exhaust O2 sensor is a bias in the exhaust O2 sensor's output.

According to another example aspect of the invention, a lean operation FDI method for an engine of a vehicle, the engine having a fuel system comprising at least one fuel injector, is presented. In one exemplary implementation, the FDI method comprises: receiving, by a controller and from a MAP sensor, a measured MAP indicative of a pressure of air in an intake manifold of the engine, the air having been drawn into the intake manifold through an air intake, detecting, by the controller, a lean operation fault where the engine is operating with a lean air/fuel ratio, estimating, by the controller and using an observer, (i) an air/fuel ratio of an exhaust gas produced by the engine and (ii) the MAP, monitoring, by the controller, first and second residual values indicative of differences between (i) the estimated air/fuel ratio of the exhaust gas and a measured air/fuel ratio of the exhaust gas from an exhaust O2 sensor and (ii) the estimated MAP and the measured MAP from the MAP sensor, respectively, and based on the monitoring of the first and second residual values, determining, by the controller, which of (i) the air intake, (ii) the exhaust O2 sensor, and (iii) the fuel injector is malfunctioning and causing the lean operation fault.

In some implementations, the observer is a Luenberger observer with a tunable gain.

In some implementations, the air intake is determined to be malfunctioning and causing the lean operation fault when: the second residual value is not within a threshold amount from zero, and the first residual value has rise time, peak time, and a steady-state value for all firing events that are greater than respective thresholds. In some implementations, the malfunction of the air intake is a leak in the air intake.

In some implementations, the fuel injector is determined to be malfunctioning and causing the lean operation fault when: the second residual value is within the threshold amount from zero, and the first residual value has a steady state value for a single firing event that is less than a threshold. In some implementations, the malfunction of the fuel injector is the fuel injector is stuck closed or clogged.

In some implementations, the exhaust O2 sensor is determined to be malfunctioning and causing the lean operation fault when: the second residual value is within the threshold amount from zero, and the first residual value has a steady state value across all firing events that is less than a threshold. In some implementations, the malfunction of the exhaust O2 sensor is a bias in the exhaust O2 sensor's output.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As discussed above, the cause of a lean operation fault could be one of a variety of components malfunctioning. This often results in a non-malfunctioning component being replaced during servicing, which increases service time and warranty costs. For example, a post-throttle air intake leak, a stuck or clogged fuel injector, and a biased exhaust oxygen (O2) sensor could all be causes of a lean operation fault. Accordingly, lean operation fault detection and isolation (FDI) techniques rationalized with manifold absolute pressure (MAP) are presented. These techniques utilize a state/output observer (e.g., a Luenberger observer with a tunable gain) to output estimate values that are compared to measured values, and their differences (residual values) are then utilized in determining which component is malfunctioning and causing the lean operation fault. The first residual value is a difference between an estimated air/fuel ratio of exhaust gas produced by an engine and a measured air/fuel ratio from an exhaust O2 sensor. The second residual value is a difference between an estimated MAP and a measured MAP from a MAP sensor.

Figure 1:
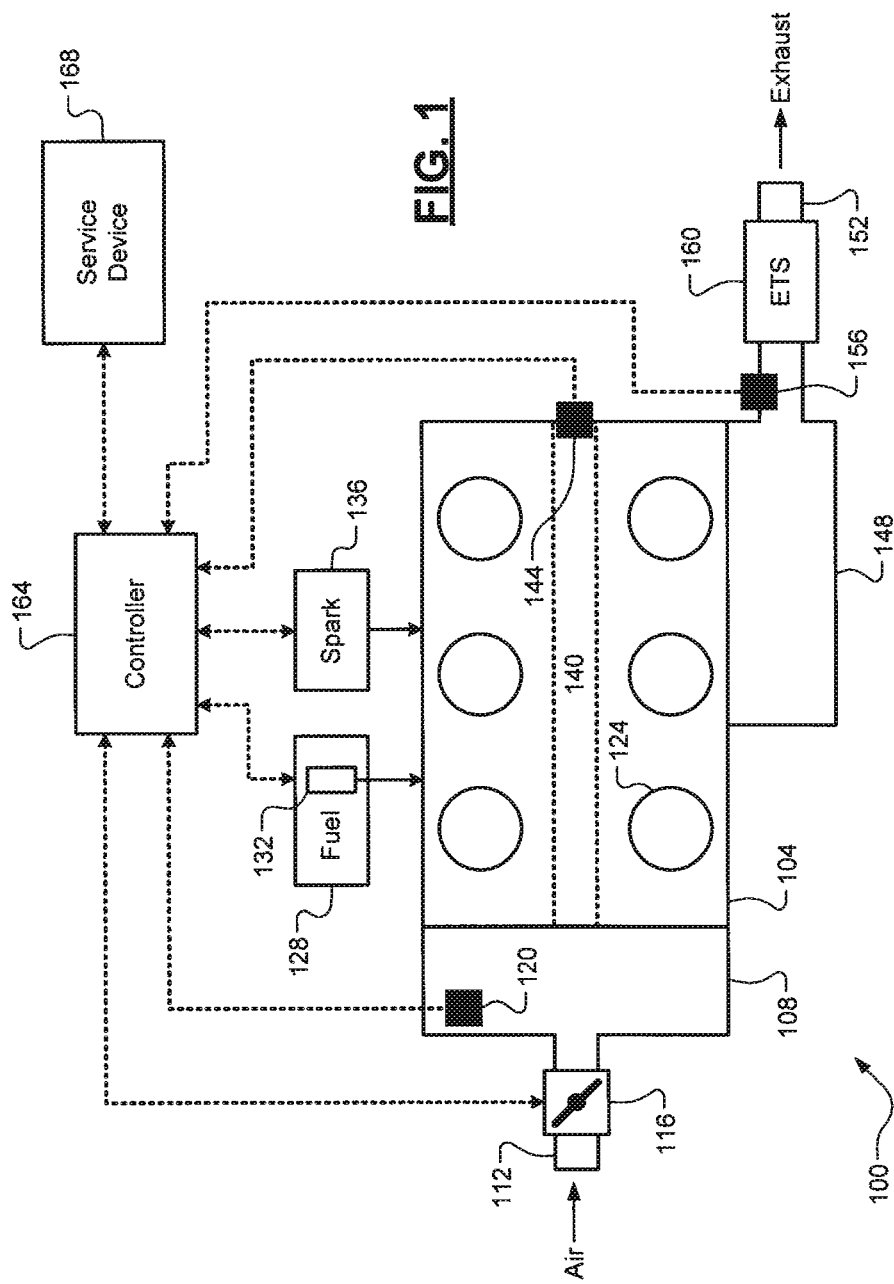
FIG. 1 is a diagram of a vehicle having an example engine according to the principles of the present disclosure.

Referring now to FIG. 1, a vehicle 100 includes an example engine 104 that draws air into an intake manifold 108 through an air intake 112 that is regulated by a throttle valve 116. A MAP sensor 120 measures a MAP indicative of air pressure in the intake manifold 108. The air in the intake manifold 108 is distributed to a plurality of cylinders 124 and combined with fuel from a fuel system 128 to form an air/fuel mixture. While six cylinders are shown, it will be appreciated that the engine 104 could include any suitable number of cylinders. The fuel system 128 includes at least one fuel injector 132 that injects the fuel into an intake port of the cylinder 124 (port fuel injection) or directly into the cylinder 124 (direct fuel injection). The fuel system 128 could further include other components that are not shown (fuel tank, fuel pump, fuel rail, etc.). The air/fuel mixture is compressed within each cylinder 124 by a respective piston (not shown). The compressed air/fuel mixture is ignited by spark from spark plugs 136, which drives the pistons and generates drive torque at a crankshaft 140. The drive torque at the crankshaft 140 is then transferred to a driveline (not shown) to propel the vehicle 100. A crankshaft position sensor 144 measures a rotational position of the crankshaft 140, which is also used to determine engine speed.

Exhaust gas resulting from combustion is expelled from the cylinders 124 into an exhaust manifold 148 and through an exhaust passage 152. An exhaust O2 sensor 156 measures an air/fuel ratio of the exhaust gas flowing through the exhaust passage 152. An exhaust treatment system (ETS) 160 (e.g., a three-way catalytic converter) treats the exhaust gas to mitigate or eliminate emissions before releasing the exhaust gas into the atmosphere. A controller 160 controls operation of the engine 104 to achieve a desired amount of drive torque (e.g., based on a driver pedal request), including controlling airflow (e.g., the throttle valve 116), fueling (e.g., the fuel injector(s) 132), and ignition (e.g., the spark plugs 136). The controller 164 is also configured to perform the lean operation FDI techniques described above and in greater detail below. In one exemplary implementation, the controller 164 is configured to output information relating to the malfunctioning component to a service device 168 (e.g., a handheld computing device). This information is then utilized by a service technician to identify and replace the malfunctioning component, thereby saving the service technician time and avoiding the replacement of non-malfunctioning components and thus decreasing service and warranty costs.

Figure 2:
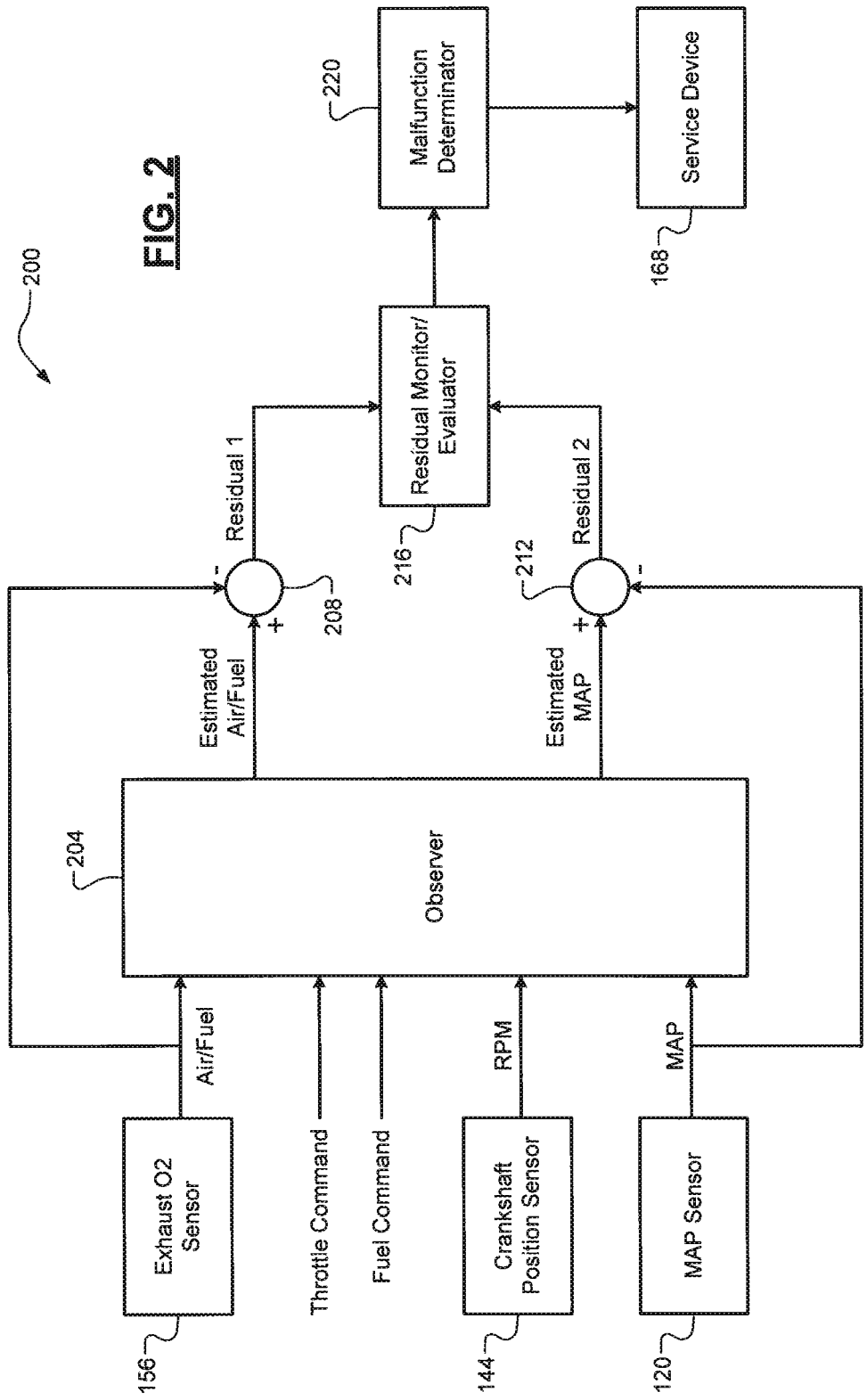
FIG. 2 is a functional block diagram of an example lean operation fault detection and isolation (FDI) system according to the principles of the present disclosure.

Referring now to FIG. 2, a functional block diagram of an example lean operation FDI system 200 is illustrated. This FDI system 200, for example, could represent an architecture that could be implemented by the controller 164. A state/output observer 204 receives the MAP signal from the MAP sensor 120, a crankshaft position or engine speed (RPM) signal from the crankshaft position sensor 144, and an exhaust air/fuel ratio signal from the exhaust O2 sensor 156. In one exemplary implementation, the observer is a Luenberger observer with a tunable gain. The gain could be tuned, for example, based on test data and/or over time based on various feedback. The observer 204 also receives throttle and fuel commands. For example, these commands could be commands generated by the controller 164 for the throttle valve 116 and the fuel injector 132 based on a driver torque request. Based on these received signals, the observer 204 outputs an estimated exhaust air/fuel ratio and an estimated MAP. This could involve, for example, utilizing complex engine, exhaust air/fuel and MAP models to estimate what the exhaust air/fuel ratio and MAP should be based on the current operating conditions.

The estimated exhaust air/fuel ratio and the estimated MAP are compared to respective measurements from the exhaust O2 sensor 156 and the MAP sensor 120 at 208 and 212 to obtain residual values (differences) Residual 1 (or "R1") and Residual 2 (or "R2"), respectively. A residual monitor or evaluator 216 receives the residual values and evaluates them, which is described in more detail below with reference to FIG. 3. This evaluation includes, for example, determining various time parameters (peak value time, rise time, settling time, etc.) and steady-state values over periods (single firing event, all firing events, etc.). The residual values and the evaluated parameters are then fed to a malfunction determinator 220, which uses this information to determine which component of the engine 104 is malfunctioning (the air intake 112, the fuel injector 132, the exhaust O2 sensor 156, etc.). The malfunction determinator 220 then outputs information indicative of the malfunctioning component to the service device 168.

Figure 3:
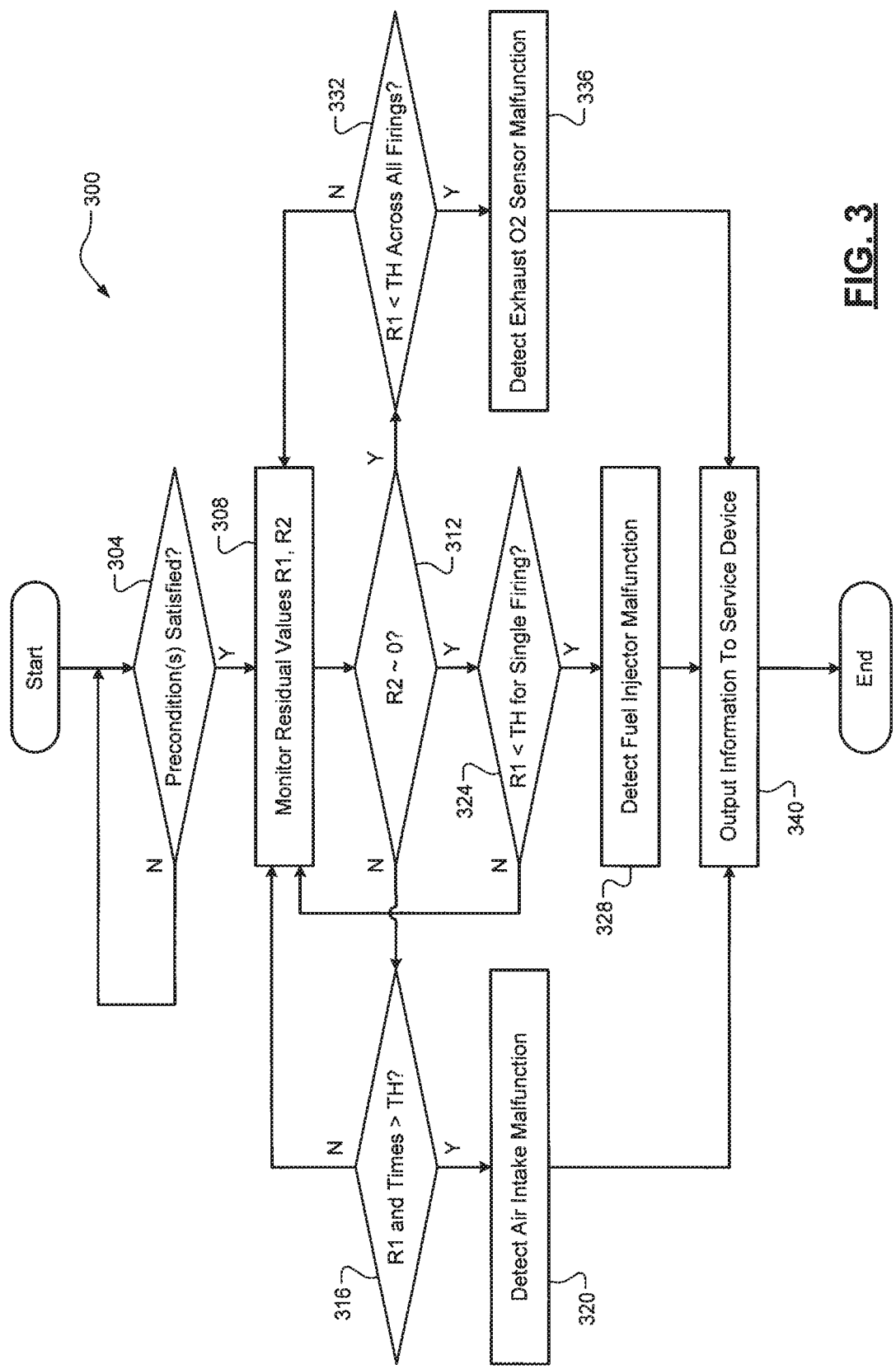
FIG. 3 is a flow diagram of an example lean operation FDI method according to the principles of the present disclosure.

Referring now to FIG. 3, a flow diagram of an example lean operation FDI method 300 is illustrated. While the various method operations will be described as being performed by the controller 164, it will be appreciated that another controller/module/system could execute or perform the method 300. At optional 304, the controller 164 determines whether a set of one or more preconditions is satisfied. This could include, for example only, the engine 104 running and there being no existing malfunctions detected. At 308, the controller 164 monitors the residual values R1, R2. At 312, the controller 164 determines whether the second residual value R2 is approximately zero or, in other words, within a threshold amount from zero. Such behavior could be indicative of no malfunction of the air intake 112. When true, the method 300 proceeds to both 324 and 332. When false, the method 300 proceeds to 316. At 316, the controller 164 determines whether time and magnitude parameters relating to R1 are greater than respective thresholds (TH). In one exemplary implementation, the controller 164 determines whether the peak value time, rise time, and a steady state value for R1 are all greater than respective thresholds. This could be, for example, for all firing events and at idle engine speed. Such behavior is indicative of a malfunction of the air intake 112. Thus, when true, the controller 164 detects that the air intake 112 is malfunctioning (e.g., a post-throttle leak) at 320 and the method then proceeds to 340.

At 324, the controller 164 determines whether the first residual value R1 is less than a respective threshold (TH) for a single firing event (e.g., corresponding to a firing event of the fuel injector 132). Such behavior is indicative of a malfunction of the fuel injector 132 (e.g., less fuel than desired is being injected, resulting in lean operation). Thus, when true, the method 300 proceeds to 328 where the controller 164 detects a malfunction of the fuel injector 132 (e.g., stuck closed, clogged, etc.) and the method 300 then proceeds to 340. At 332, the controller 164 determines whether R1 is less than a respective threshold (TH) across all firing events (e.g., all firing events for a single engine cycle). Such behavior is indicative of a malfunction of the exhaust O2 sensor 156 (e.g., the exhaust air/fuel ratio is incorrectly being measured, resulting in lean operation). Thus, when true, the method 300 proceeds to 336 where the controller 164 detects a malfunction of the exhaust O2 sensor 156 and the method 300 then proceeds to 340. At optional 340, the controller 164 outputs information indicative of the malfunctioning component to the service device 168. It will be appreciated that other action could be taken, such as setting a fault or malfunction flag or actuating a malfunction indicator lamp (MIL). The method 300 then ends or returns to 304 for one or more additional cycles.

In one exemplary implementation, the thresholds described above herein could each be calibrated such as to keep emissions below a government-specified standard level.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A lean operation fault detection and isolation (FDI) system for an engine of a vehicle, the engine having a fuel system comprising at least one fuel injector, the lean operation FDI system comprising:
an intake manifold absolute pressure (MAP) sensor configured to measure a MAP indicative of a pressure of air in an intake manifold of the engine, the air having been drawn into the intake manifold through an air intake; and
a controller configured to:
detect a lean operation fault where the engine is operating with a lean air/fuel ratio;
using an observer, estimate (i) an air/fuel ratio of an exhaust gas produced by the engine and (ii) the MAP;
monitor first and second residual values indicative of differences between (i) the estimated air/fuel ratio of the exhaust gas and a measured air/fuel ratio of the exhaust gas from an exhaust oxygen (O2) sensor and (ii) the estimated MAP and the measured MAP from the MAP sensor, respectively; and
based on the monitoring of the first and second residual values, determine which of (i) the air intake, (ii) the exhaust O2 sensor, and (iii) the fuel injector is malfunctioning and causing the lean operation fault.

2. The FDI system of claim 1, wherein the observer is a Luenberger observer with a tunable gain.

3. The FDI system of claim 1, wherein the controller is configured to determine that the air intake is malfunctioning and causing the lean operation fault when:
the second residual value is not within a threshold amount from zero; and
the first residual value has rise time, peak time, and a steady-state value for all firing events that are greater than respective thresholds.

4. The FDI system of claim 3, wherein the malfunction of the air intake is a leak in the air intake.

5. The FDI system of claim 1, wherein the controller is configured to determine that the fuel injector is malfunctioning and causing the lean operation fault when:
the second residual value is within the threshold amount from zero; and
the first residual value has a steady state value for a single firing event that is less than a threshold.

6. The FDI system of claim 5, wherein the malfunction of the fuel injector is the fuel injector is stuck closed or clogged.

7. The FDI system of claim 1, wherein the controller is configured to determine that the exhaust O2 sensor is malfunctioning and causing the lean operation fault when:
the second residual value is within the threshold amount from zero; and
the first residual value has a steady state value across all firing events that is less than a threshold.

8. The FDI system of claim 7, wherein the malfunction of the exhaust O2 sensor is a bias in the exhaust O2 sensor's output.

9. A lean operation fault detection and isolation (FDI) method for an engine of a vehicle, the engine having a fuel system comprising at least one fuel injector, the lean operation FDI method comprising:
receiving, by a controller and from an intake manifold absolute pressure (MAP) sensor, a measured MAP indicative of a pressure of air in an intake manifold of the engine, the air having been drawn into the intake manifold through an air intake;

detecting, by the controller, a lean operation fault where the engine is operating with a lean air/fuel ratio;

estimating, by the controller and using an observer, (i) an air/fuel ratio of an exhaust gas produced by the engine and (ii) the MAP;

monitoring, by the controller, first and second residual values indicative of differences between (i) the estimated air/fuel ratio of the exhaust gas and a measured air/fuel ratio of the exhaust gas from an exhaust oxygen (O2) sensor and (ii) the estimated MAP and the measured MAP from the MAP sensor, respectively; and based on the monitoring of the first and second residual values, determining, by the controller, which of (i) the air intake, (ii) the exhaust O2 sensor, and (iii) the fuel injector is malfunctioning and causing the lean operation fault.

10. The FDI method of claim 9, wherein the observer is a Luenberger observer with a tunable gain.

11. The FDI method of claim 9, wherein the air intake is determined to be malfunctioning and causing the lean operation fault when:

the second residual value is not within a threshold amount from zero; and the first residual value has rise time, peak time, and a steady-state value for all firing events that are greater than respective thresholds.

12. The FDI method of claim 11, wherein the malfunction of the air intake is a leak in the air intake.

13. The FDI method of claim 9, wherein the fuel injector is determined to be malfunctioning and causing the lean operation fault when:

the second residual value is within the threshold amount from zero; and the first residual value has a steady state value for a single firing event that is less than a threshold.

14. The FDI method of claim 13, wherein the malfunction of the fuel injector is the fuel injector is stuck closed or clogged.

15. The FDI method of claim 9, wherein the exhaust O2 sensor is determined to be malfunctioning and causing the lean operation fault when:

the second residual value is within the threshold amount from zero; and the first residual value has a steady state value across all firing events that is less than a threshold.

16. The FDI method of claim 15, wherein the malfunction of the exhaust O2 sensor is a bias in the exhaust O2 sensor's output.

* * * * *